US012701182B2

(12) United States Patent
Muniyan et al.

(10) Patent No.: US 12,701,182 B2
(45) Date of Patent: Aug. 4, 2026

(54) MOBILE APPLICATION FOR PRIORITIZED COMMUNICATION

(71) Applicant: Glolink Technologies Inc., Bentonville, AR (US)

(72) Inventors: Kalaiselvan Muniyan, Bentonville, AR (US); Kalaiarasi Kalaiselvan, Bentonville, AR (US); Ridhikaanth Kalaiselvan, Bentonville, AR (US); Kaushik Kalaiselvan, Bentonville, AR (US)

(73) Assignee: Glolink Technologies Inc., Bentonville, AR (US)

( * ) Notice: Subject to any disclaimer, the term of this patent is extended or adjusted under 35 U.S.C. 154(b) by 349 days.

(21) Appl. No.: 18/228,312

(22) Filed: Jul. 31, 2023

(65) Prior Publication Data

US 2024/0396990 A1     Nov. 28, 2024

Related U.S. Application Data

(63) Continuation-in-part of application No. 17/504,859, filed on Oct. 19, 2021, now Pat. No. 11,758,467.

(60) Provisional application No. 63/094,521, filed on Oct. 21, 2020.

(51) Int. Cl.
| | |
|---|---|
| *H04W 4/06* | (2009.01) |
| *H04M 1/72463* | (2021.01) |
| *H04M 1/72484* | (2021.01) |
| *H04W 4/16* | (2009.01) |

(52) U.S. Cl.
CPC ... *H04M 1/72463* (2021.01); *H04M 1/72484* (2021.01); *H04W 4/06* (2013.01); *H04W 4/16* (2013.01)

(58) Field of Classification Search
CPC ......... H04M 1/72463; H04M 1/72484; H04W 4/06; H04W 4/16
USPC ......................................................... 455/411
See application file for complete search history.

(56) References Cited

U.S. PATENT DOCUMENTS

| | | | | |
|---|---|---|---|---|
| 5,845,219 | A | 12/1998 | Henriksson | |
| 6,574,471 | B1 | 6/2003 | Rydbeck | |
| 7,580,678 | B2 | 8/2009 | Byman-Kivivuori | |
| 7,606,561 | B2 | 10/2009 | Mathew | |
| 7,945,254 | B2 * | 5/2011 | Zabawskyj | .......... H04N 21/632 455/435.3 |
| 8,346,231 | B1 * | 1/2013 | Smith | .................... H04M 3/563 379/202.01 |
| 8,494,575 | B2 | 7/2013 | Foley | |
| 8,532,627 | B1 | 9/2013 | Nassimi | |

(Continued)

FOREIGN PATENT DOCUMENTS

| | | |
|---|---|---|
| KR | 101820091 | 2/2018 |
| WO | 2015085402 | 6/2015 |
| WO | 2017124474 | 7/2017 |

OTHER PUBLICATIONS

International Search Report and Written Opinion from Corresponding PCT Patent Application PCT/US21/55841 Mailed Feb. 9, 2022; Korean Intellectual Property Office.

*Primary Examiner* — Mark G. Pannell
(74) *Attorney, Agent, or Firm* — Head, Johnson, Kachigian & Wilkinson, PC

(57) ABSTRACT

A mobile application capable of superseding default phone settings to give priority to calls and messages based on a preconfigured list, as well as broadcast messages and calls within a defined group of members.

6 Claims, 1 Drawing Sheet

```
┌─────────────────────────────────────────────┐
│ Allow a user of a mobile device to communicate with │
│   one or more other mobile devices regardless of    │
│   whether the other mobile devices have settings    │
│        preventing such communications               │
└─────────────────────────────────────────────┘
                      │
                      ▼
┌─────────────────────────────────────────────┐
│  Allow the user to set a time frame in which a      │
│  communication is expected from the user to the     │
│  recipient users or a subset of one or more of the  │
│              recipient users                         │
└─────────────────────────────────────────────┘
                      │
                      ▼
┌─────────────────────────────────────────────┐
│ Notify the recipient users or the subset of one or more │
│ of the recipient users to whom the communication is  │
│ expects, the user, or both: after the time frame if the │
│ communication is not received; before the time frame; │
│                  or both.                            │
└─────────────────────────────────────────────┘
```

(56)                References Cited

U.S. PATENT DOCUMENTS

| | | | |
|---|---|---|---|
| 8,576,828 B1 | 11/2013 | Massey, Jr. | |
| 8,612,403 B2 | 12/2013 | Kraft | |
| 8,868,053 B2 | 10/2014 | Thompson | |
| 9,239,726 B2 | 1/2016 | Peterson | |
| 9,509,650 B2 | 11/2016 | Puranik | |
| 10,079,939 B1 | 9/2018 | Bostick | |
| 10,531,318 B1* | 1/2020 | Verma | H04W 28/26 |
| 10,673,798 B2 | 6/2020 | Shan et al. | |
| 2003/0055893 A1* | 3/2003 | Sato | H04L 67/104 |
| | | | 709/224 |
| 2003/0197615 A1 | 10/2003 | Roche | |
| 2004/0094619 A1 | 5/2004 | Silberberg | |
| 2004/0225733 A1 | 11/2004 | Tesink et al. | |
| 2005/0008127 A1 | 1/2005 | Holmes et al. | |
| 2005/0286701 A1 | 12/2005 | Suvanne et al. | |
| 2006/0123007 A1* | 6/2006 | Aaron | H04L 63/0263 |
| | | | 707/999.009 |
| 2007/0037605 A1* | 2/2007 | Logan | H04M 3/42008 |
| | | | 455/567 |
| 2007/0116226 A1* | 5/2007 | Bennett | H04M 3/565 |
| | | | 379/202.01 |
| 2007/0254633 A1* | 11/2007 | Mathew | H04M 1/72418 |
| | | | 455/412.1 |
| 2007/0293143 A1* | 12/2007 | Harris | H04W 36/0007 |
| | | | 455/3.01 |
| 2008/0025489 A1 | 1/2008 | Dye et al. | |
| 2008/0064378 A1* | 3/2008 | Kahan | H04L 12/66 |
| | | | 455/414.1 |
| 2009/0077191 A1* | 3/2009 | Bristow | H04L 51/214 |
| | | | 709/207 |
| 2009/0119374 A1 | 5/2009 | O'Sullivan et al. | |
| 2009/0170492 A1 | 7/2009 | Lee | |
| 2009/0290696 A1* | 11/2009 | K. N. | H04M 1/575 |
| | | | 379/207.02 |
| 2010/0190474 A1* | 7/2010 | Rajguru | H04W 12/08 |
| | | | 707/610 |
| 2010/0211911 A1* | 8/2010 | Logan | H04M 3/567 |
| | | | 370/260 |
| 2011/0165858 A1* | 7/2011 | Gisby | H04W 48/04 |
| | | | 455/411 |
| 2011/0244824 A1 | 10/2011 | Hursey et al. | |
| 2012/0040646 A1* | 2/2012 | Garg | H04M 3/565 |
| | | | 455/414.1 |
| 2012/0244836 A1* | 9/2012 | Colbert | H04L 12/1822 |
| | | | 455/411 |
| 2012/0306649 A1 | 12/2012 | Rodger et al. | |
| 2012/0312247 A1 | 12/2012 | Ebersole | |
| 2013/0244623 A1 | 9/2013 | Cudack | |
| 2014/0179275 A1* | 6/2014 | Goguen | H04M 3/563 |
| | | | 455/566 |
| 2014/0362742 A1* | 12/2014 | Martinez | H04L 12/1818 |
| | | | 370/262 |
| 2015/0056970 A1* | 2/2015 | Barrett | H04W 4/16 |
| | | | 455/416 |
| 2015/0181031 A1 | 6/2015 | Warnack | |
| 2015/0381817 A1* | 12/2015 | Zhao | H04L 65/4038 |
| | | | 379/202.01 |
| 2016/0050642 A1 | 2/2016 | Brown et al. | |
| 2016/0188587 A1* | 6/2016 | Martin | G06F 16/134 |
| | | | 707/734 |
| 2016/0227033 A1* | 8/2016 | Song | H04M 1/72451 |
| 2016/0330160 A1 | 11/2016 | Shan et al. | |
| 2017/0161685 A1* | 6/2017 | Jennings | G06Q 30/0631 |
| 2019/0289367 A1 | 9/2019 | Siddiq | |
| 2021/0084710 A1 | 3/2021 | Sutherland | |
| 2021/0104158 A1 | 4/2021 | Pasotto et al. | |
| 2021/0344730 A1* | 11/2021 | Jing | H04L 65/1016 |

* cited by examiner

Allow a user of a mobile device to communicate with one or more other mobile devices regardless of whether the other mobile devices have settings preventing such communications Allow the user to set a time frame in which a communication is expected from the user to the recipient users or a subset of one or more of the recipient users Notify the recipient users or the subset of one or more of the recipient users to whom the communication is expects, the user, or both: after the time frame if the communication is not received; before the time frame; or both.

MOBILE APPLICATION FOR PRIORITIZED COMMUNICATION

CROSS REFERENCE

This application is a continuation-in-part of U.S. patent application Ser. No. 17/504,859 filed Oct. 19, 2021, which is based on and claims priority to U.S. Provisional Patent Application No. 63/094,521 filed Oct. 21, 2020.

BACKGROUND OF THE INVENTION

Field of the Invention

This invention relates generally to a mobile application for prioritized communication, and more particularly, but not by way of limitation, to a mobile application capable of superseding default phone settings to give priority to calls and messages based on a preconfigured list, as well as broadcast messages and calls within a defined group of members.

Description of the Related Art

Many people keep a mobile device with them at all times for communication. It is increasingly common for users of such mobile devices to keep their devices in silent mode or do not disturb mode at all times. This may cause the users to miss desired communication, such as communication from family members or other trusted contacts, as well as expected calls during a specific time frame.

Sometimes users are part of a permanent group, such as a family, wherein the ability to communicate among members, regardless of each members' device settings, is desired at all times. Other times, users are part of a temporary group, such as attendees at an event, wherein the ability of the event organizers to communicate with attendees, regardless of each attendee's device settings, is desired for the duration of the event. For example, such events may include sporting events, workplace events/meetings, birthday parties, or natural disasters. The organizers of such an event may need to communicate important information to the attendees of the event, and may also desire to prevent attendees from receiving disruptive communications, like phone calls, during the event.

Based on the foregoing, it is desirable to provide a mobile application that allows a user to communicate with the mobile device of another user, regardless of the settings of that mobile device.

It is further desirable for the mobile application to allow such prioritized communication to occur from a central user to recipient users only for the duration of an event.

It is further desirable for the mobile application to prevent all other communications to recipient users for the duration of the event, and to provide notice after the event of any blocked communications.

It is further desirable for the mobile application to allow such prioritized communication to occur between certain group members at all times.

It is further desirable for the mobile application to notify a user if a communication was expected during a designate time frame, but was not received.

SUMMARY OF THE INVENTION

In general, in a first aspect, the invention relates to a method of prioritizing communication by a mobile device, the method comprising allowing an initiating user of the mobile device to communicate with one or more other mobile devices used by recipient users regardless of whether the other mobile devices have settings preventing such communications. The method may further comprise allowing the initiating user to set a time frame in which a communication is expected from the initiating user to the recipient users or a subset of one or more of the recipient users and notifying the recipient users or the subset of one or more of the recipient users to whom the communication is expected, the initiating user, or both the recipient users or the subset of one or more of the recipient users to whom the communication is expected and the initiating user: after the time frame if the communication is not received; before the time frame; or both after the time frame if the communication is not received and before the time frame.

The communication may be a call, an audio message, a video message, or a text message. Multiple groups of recipient users may be configured on the initiating user's mobile device.

The method may further comprise providing an auto-answer feature capable of allowing one or more of the mobile devices to automatically answer the communication. The auto-answer feature may be configured to enable auto-answer for specific contacts. The method may further comprise providing a countdown to the initiating user regarding the time frame for the communication and automatically activating the communication when the countdown is complete. The method may further comprise allowing the initiating user to snooze the countdown.

Allowing the initiating user of the mobile device to communicate with the one or more other mobile devices used by recipient users regardless of whether the other mobile devices have settings preventing such communications may be limited to a specific time interval. The method may further comprise displaying notifications or communication attempts from contacts outside a preset group of contacts during the specific time interval upon the conclusion of the time interval.

In a second aspect, the invention relates to a method of prioritizing communication by a mobile device, the method comprising an initiating user of the mobile device to communicate with one or more other mobile devices used by recipient users regardless of whether the other mobile devices have settings preventing such communication, where the communication is a live, real-time, one-way communication from the initiating user to the recipient users. This may occur during an event, where the initiating user is an organizing member of the event. The communication may be a call, and the method may further comprise the recipient users' mobile devices automatically answering the call. The method may further comprise automatically muting the recipient users' mobile devices.

BRIEF DESCRIPTION OF THE DRAWINGS

FIG. 1 is a flow chart illustrating the claimed method of the present invention.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a mobile application for prioritized communication. The application may be capable of superseding default phone settings to give priority to calls and messages from contacts on a preconfigured list. The application may be capable of broadcasting messages and calls within a defined group of members. Specifically, the communication may be any kind of text message format, including but not limited to text, audio recording(s), video recording(s) or any other text message content, and/or a call. The superseding feature may allow the user to set different superseding settings among different groups or within a group.

The application may provide for a list of configured contacts, which may be phone numbers configured into a group or multiple groups. For example, groups may include a family group, an office group, a political group, a sports organization, and sports team, two individuals, or any other desired group.

The application may provide for one-way communication. This feature may be ideal for organizations or large-scale teams. The one-way communication feature may be used for events held by an organization or a team that requires effective communication of announcements for various situations, ranging from scheduled activities to emergencies. For example, the one-way communication feature may be used by sports teams, at public sports events like bicycling or runs, at workplace events or meetings, at birthday parties, or during natural disasters. For the one-way communication feature, the application may provide for one central user, who facilitates all communication and acts as the host to the group or team, and multiple recipient users. The one-way communication feature may allow the central user to broadcast a communication to a group of contacts who are defined and/or configured by the central user, may be in real-time or prerecorded, and may be in audio message format or text message format.

The application may allow the initiating user for an event with multiple participants to send a real-time, live voice call to be picked up by the participants. If there are any participants who do not pick up the call, the application may allow the call to be automatically answered and turned on. This may be useful if there is a disaster in the path of the participants that the participants are not aware of. The one-way live call that is automatically answered may allow for the event organizer to constantly give updates via the call as a quick and effective way for the participants to evade imminent danger. This may be advantageous over notifications that are pre-recorded and sent since the pre-recorded messages might not contain the most up-to-date conditions. In addition, a live call would not be delayed, as a pre-recorded communication would be. Thus, the live call that is automatically answered by the participants may be beneficial due to the immediacy with which updates are transmitted. Consent may be required from all participants and the organizing user for the duration of the event. The participants and the organizing user may need to have the application installed onto their mobile communication devices. The application may need to mute the participant's microphone during the call, and may need to monitor other calls that the participant might receive amid the live call. The application may allow the participant to have the option of placing the organizing user's active call on hold for the purpose of attending another call that the participant feels is necessary to take.

The application may allow multiple groups to be configured. There may be overlap in individual contacts assigned among different groups. The settings and priorities may or may not differ for the same individual's contact, depending on which group the contact is assigned to.

The application may allow the central user and the recipient users to supersede their messages, calls, and other notifications from outside preconfigured groups of contacts or individual configured contacts for the entire duration of an event or a desired time frame set by the central user. The central user may be able to configure the outside preconfigured groups of contacts or individual configured contacts. In the case of the central user and the recipient users, the application may provide an auto-answer feature, described below, for the outside configured groups of contacts and individual configured contacts who are expected to give the central user calls or messages via audio or text. This may be disabled for a desired time frame set by the central user. The application may allow the central user and the recipient users to customize the way in which the notifications by outside configured groups of contacts and individual configured contacts are communicated to the user immediately following the end of the user's set time frame. The app may either display the missed notifications via text or speak the notifications. The user may also be contacted immediately following the end of the user's set time frame for the event if the expected notifications from expected configured contacts, both of which had to have been previously set by the user, were not received in that set time frame. The configured contacts' communications may be monitored continuously or during a time frame that may be pre-set by the user.

As superseding introduces new priorities in the various users to whom the central user is communicating, the application may require permission to be acquired by the central user for legal and privacy concerns. This permission may need to be granted at each event that is facilitated by the central user in order to ensure an accurate and updated mutual agreement among the recipient users and the central user.

Each recipient user may or may not have the application installed on their mobile device. If the recipient user does not have the application installed, then any agreements, consents, and permissions may be validated by the recipient users through some method of contact. The authorization may be effective for one event only and may have to be reauthorized for each event thereafter, regardless of whether the future events are recurring, in order to maintain mutual agreement among the central and recipient users. Alternately, the authorization may be required once for any communications going forward. If the recipient user does have the app installed on their mobile device, then permission may be obtained by the recipient user either at each event or, alternately, once for any communications going forward.

During use of the one-way communication feature, the application may allow voice notifications to be sent by the central user to the recipient users in real-time. The application may additionally or alternately allow the central user to pre-record and store voice notifications. The application may allow the central user to manually send stored voice notifications at a time in which the central user sees fit, according to his or her event/program schedule. The application may additionally or alternately send stored voice notifications at a scheduled time set by the central user.

The application may allow any user, whether the central user or a recipient user, to set a time frame in which notifications and/or broadcasts are disabled. In the case of the central user, the application may allow the central user to disable the auto-answer feature for configured contacts who are expected to give the central user calls or messages for a time interval set by the central user. In the case of the central and recipient users, the application may allow the user to disable any broadcasts, including calls, audio messages, and text messages, that are expected to be received from certain configured contacts who were previously set by the user for the time interval set by the user. In all cases, at the end of the time interval set by the user, the application may allow the user to be notified of any broadcasts, including calls, audio messages, and text messages, that were received by the user during the set time interval. The application may allow the central user and the recipient users to customize the way in which the notifications by outside configured groups of contacts and individual configured contacts are communicated to the user immediately following the end of the user's set time frame. The application may either display the missed notifications via text or speak the notifications. The application may also communicate with the user immediately following the end of the user's set time frame for the event if the expected notifications from expected configured contacts, both of which had to have been previously set by the user, were not received in that set time frame. Again, the user could either choose to make these notifications be displayed via text immediately following the set time interval or displayed via text and spoken out loud immediately following the set time interval.

The application may additionally or alternately provide for two-way communication. This feature may be ideal for communications at the family level. The two-way communication feature may provide the aforementioned broadcasting features described above for one-way communication, but with the ability for all family users to respond and set preferences for each other. In other words, all family users may have the privileges of central users described above.

The application may be capable of monitoring incoming calls to family users to identify if the call is from a configured contact. If so, the application may be capable of superseding the phone settings to ring the phone with volume regardless of the mode that the phone is in, such as do not disturb mode, silent mode, etc. The application may allow the user to set calls from a specific phone number that are to be expected in a specific time frame. The application may allow the user to set priorities for superseding the calls for the configured contacts: priorities for superseding may be set among groups of configured contacts, i.e. one group over another; priorities for superseding may be set for individual configured contacts within an existing group; and/or priorities for superseding may be set for individual configured contacts, whether they are in a group or not.

The application may allow calls from configured contacts to work in synchrony with their respective time parameters. The application may allow users to set a time frame for when to expect certain calls or notifications from certain configured contacts. The application may provide retrospective notification when an expected call or notification is not received within the time frame set by the user from a particular configured contact or a member of a particular group of configured contacts. The retrospective notification may occur when the set time frame ends. The application may additionally or alternately provide proactive notification when the time frame set by the user begins or at a certain number of minutes before the time frame begins. The proactive notification may notify the user that they should expect a call or notification from a particular configured contact or a member of a particular group of configured contacts in that time frame.

In the case of a notification of the recipient user regarding the absence of an expected call or notification in a set time frame, the time frame may be capable of being set by the user(s) and may be unique to configured contacts or groups within the configured contacts. The notification may be sent to the initiating user at a time specified by the recipient user in the user's default settings on the amount of time before, during, or after missed communication for the notification to emerge. The user may then customize the application to automatically send a notification to the user that was supposed to initiate the communication about the missed communication. This notification may be set by the recipient user to either supersede the initiating user's phone ringer settings or, alternately, not to supersede the initiating user's phone ringer settings, depending on how the recipient user has configured that initiator's contact for that specific time interval or event, or the default settings for that initiator's contact regardless of the events, time intervals, or groups set for that initiator.

In the case of a notification of the initiating user regarding the absence of an expected communication in a set time frame to a configured recipient user, the time frame may be capable of being set by the user(s) and may be unique to configured contacts or groups with configured contacts. The notification may be sent to the recipient user at a time specified by the initiating user in the user's default settings on the amount of time before, during, or after missed communications for the notification to emerge. The user may then customize the application to automatically send a notification to the user that was supposed to receive the communication about the missed communication. This notification may be set by the recipient user to either supersede the receiving user's phone ringer settings or, alternately, not to supersede the receiving user's phone ringer settings, depending on how the initiating user has configured that receiving user's contact for that specific time interval or event, or the default settings for that receiving user's contact regardless of the events, time intervals, or groups set for that receiving user.

The application may provide an auto-answer feature, which may allow the application to pick up a call from a configured contact in a certain amount of time if the user does not attend to the call within that set time frame. The time frame of when the phone rings until the application automatically answers may be customized by the user. The application may acquire agreement from the user to automatically answer the call to avoid any legal issues or privacy concerns. Permission from phone carriers and/or operating systems may need to be acquired in order to enable some of the features.

The auto-answer feature may also work in conjunction with the feature allowing a time frame for an expected call or notification, allowing the auto-answer feature to be activated for the initiating and/or receiving user's contact so that there can be either an additional or an alternate push notification that emerges for the recipient or initiating user that is from the auto-answer feature, prompting the user to initiate an automatic communication previously set by the receiving or initiating user for that initiating or receiving user.

The auto-answer feature may allow permission to be set by the user to allow or not allow automatic answering. The application may be configured to enable auto-answer for specific contacts set by the user or groups of contacts set by the user. The auto-answer feature may be set for expecting communications from configured contacts or communications that would need to be initiated by the user.

Retroactively, if the auto-answer feature for a contact or a group of contacts is activated and the communication expected to or, alternately, from the contact or group of contacts has not been initiated, the user who was supposed to either initiate or was supposed to receive the communication may get a push notification with a live readout of a countdown timer that may be configured to be spoken through the phone's speaker or its connected audio output sources or, additionally and alternately, be just a push notification that shows up with the countdown timer. Once the countdown timer is complete, a call may automatically be activated to the respectively configured contact or group of contacts. The countdown timer that emerges as a push notification may be set by the user to how much time before or after the event of expecting a communication or needing to initiate a communication to a configured contact or group of contacts that the push notification alerting the user of the impending automatic communication and its method, namely call or text, may emerge. Options on the push notification message with live readout of a countdown timer to automatic communication may include a snooze option, which may re-send the same push notification at a certain time in the future that can be set by the user either at that time of snoozing or as a default snooze time setting in the application's main settings, and an option to change the method of automatic communication from call to text or from text to call. This option may allow for a change for a live impending automatic communication or, alternately, the mode of communication may be changed for the same next notification for automatic communication upon snoozing the impending automatic communication.

The application may be used with mobile phone devices and/or wearable devices such as smartwatches, fitness trackers, Google Glass, etc. or other mobile devices. Additionally or alternately, the application may be or may be used with a desktop and/or web application. For example, a central user organizing large scale events may require higher-order web infrastructure to accommodate the massive capacity of recipients and the text and/or voice notifications that would need to be sent to those recipients at a pre-defined manner, as set by the central user. Also, even though the use of the desktop and web applications may be best suited for large scale events, any users, be it family, small groups, etc., may also be able to use the desktop and web application should they want to manage their application profile on the desktop and/or web.

The application may allow the initiating user to set up a reminder for the initiating user to be reminded to call or text a recipient user that the recipient user has not prior knowledge of since it is an impromptu event in which the recipient user is not configured in any time interval, defined group, or event on either the initiating user's application or the recipient user's application. If the initiating user ignores or forgets to initiate the communication, then the application may allow the initiating user to set the settings in such a way as to supersede the phone ringer setting on the initiating user's phone to notify the initiating user that the communication that was supposed to be initiated was missed. This notification may also be set to be a proactive notification where the sending of and superseding of the initiating user's phone ringer settings is sent at a time before the communication was supposed to take place. The auto-answer feature may be capable of being activated for this. The application may allow the recipient user, who may have no knowledge of the initiating user's intentions to contact the recipient user due to not being a configured contact or not having any assigned event, timer interval, or defined group in the recipient user's application or the initiating user's application, to automatically receive a notification telling the recipient user to expect a communication from the initiating user at a certain time frame in the near future. The amount of time that the notification that tells the recipient user of the initiating user's intentions to communicate with the recipient user precedes the time at which the initiating user plans to communicate with the recipient user may be set by the recipient user. If the time for the initiating user to communicate with the recipient user comes and no communication is made, the application may notify the recipient user. The application may be set to supersede the recipient user's phone ringer settings for the message or call that the recipient user makes to the initiating user, and the application may be set to supersede the initiating user's phone ringer settings by the recipient user for that particular contact.

This feature may be beneficial due to its implication in actually succeeding in making communications that were planned by an initiating user but of which the recipient user has no knowledge. For relatively impromptu communications where only the initiating user plans to communicate with the recipient user without the recipient user having prior knowledge or expectation that the communication will happen to, the communication has a higher likelihood of successfully happening because even without the initiating user going the extra step and letting the recipient user know of the initiating user's intent to communicate with the recipient user, the recipient user can still anticipate, prepare, and plan accordingly to accommodate the communication from the initiating user, which, ultimately, would confer a higher success rate of communication of this nature, where one person knows but the other person does not know, of actually following through as opposed to back and forth failed attempts for the initiating user to reach the recipient user.

Whereas, the devices and methods have been described in relation to the drawings and claims, it should be understood that other and further modifications, apart from those shown or suggested herein, may be made within the spirit and scope of this invention.

What is claimed is:

1. A method of prioritizing communication by a mobile device, the method comprising:

allowing an initiating user of the mobile device to communicate with one or more other mobile devices used by recipient users regardless of whether the other mobile devices have settings preventing such communications;

allowing the initiating user to set a time frame in which a communication is expected from the initiating user to the recipient users or a subset of one or more of the recipient users; and notifying the recipient users or the subset of one or more of the recipient users to whom the communication is expected, the initiating user, or both the recipient users or the subset of one or more of the recipient users to whom the communication is expected and the initiating user:

after the time frame if the communication is not received;

before the time frame; or both after the time frame if the communication is not received and before the time frame;

the method further comprising:

providing a countdown to the initiating user regarding the time frame for the communication;

automatically activating the communication when the countdown is complete; and allowing the initiating user to snooze the countdown.

2. The method of claim 1 where the communication is a call, an audio message, a video message, or a text message.

3. The method of claim 1 where multiple groups of recipient users are configured on the initiating user's mobile device.

4. The method of claim 1 further comprising providing an auto-answer feature capable of allowing one or more of the mobile devices to automatically answer the communication.

5. The method of claim 4 where the auto-answer feature is configured to enable auto-answer for specific contacts.

6. A method of prioritizing communication by a mobile device, the method comprising:

allowing an initiating user of the mobile device to communicate with one or more other mobile devices used by recipient users regardless of whether the other mobile devices have settings preventing such communications, where allowing the initiating user of the mobile device to communicate with the one or more other mobile devices used by recipient users regardless of whether the other mobile devices have settings preventing such communications is limited to a specific time interval;

allowing the initiating user to set a time frame in which a communication is expected from the initiating user to the recipient users or a subset of one or more of the recipient users; and notifying the recipient users or the subset of one or more of the recipient users to whom the communication is expected, the initiating user, or both the recipient users or the subset of one or more of the recipient users to whom the communication is expected and the initiating user:

after the time frame if the communication is not received;

before the time frame; or both after the time frame if the communication is not received and before the time frame;

the method further comprising displaying notifications or communication attempts from contacts outside a preset group of contacts during the specific time interval upon the conclusion of the time interval.

* * * * *